(12) United States Patent
Poe et al.

(10) Patent No.: US 10,567,090 B2
(45) Date of Patent: Feb. 18, 2020

(54) USE OF HIGH SPEED RADIO FREQUENCY PROTOCOLS FOR COMMUNICATION WITH PIPELINE PIGS AND INSPECTION TOOLS

(71) Applicant: TDW Delaware, Inc., Wilmington, DE (US)

(72) Inventors: Roger L. Poe, Beggs, OK (US); Ed Maynard, Holladay, UT (US); Philip M. Maltby, Sand Springs, OK (US)

(73) Assignee: TDW Delaware, Inc., Wilmington, DE (US)

( * ) Notice: Subject to any disclaimer, the term of this patent is extended or adjusted under 35 U.S.C. 154(b) by 0 days.

(21) Appl. No.: 16/168,057

(22) Filed: Oct. 23, 2018

(65) Prior Publication Data

US 2019/0123835 A1    Apr. 25, 2019

Related U.S. Application Data

(60) Provisional application No. 62/575,999, filed on Oct. 23, 2017.

(51) Int. Cl.
| | |
|---|---|
| *H01Q 13/28* | (2006.01) |
| *F16L 55/46* | (2006.01) |
| *F16L 55/48* | (2006.01) |
| *F16L 41/00* | (2006.01) |
| *G01M 3/00* | (2006.01) |
| *G01V 15/00* | (2006.01) |
| *H01Q 1/44* | (2006.01) |
| *H04B 7/00* | (2006.01) |

(Continued)

(52) U.S. Cl.
CPC ............. *H04B 13/00* (2013.01); *H04B 7/15* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 5,651,638 A | 7/1997 | Heggerud | |
| 2005/0145018 A1* | 7/2005 | Sabata | G01N 17/00 73/49.1 |

(Continued)

FOREIGN PATENT DOCUMENTS

| | | | | |
|---|---|---|---|---|
| CA | 2341181 A1 * | 10/2000 | .......... | E21B 17/006 |
| DE | 102005059023 A1 * | 6/2007 | .......... | B08B 9/0551 |

*Primary Examiner* — Mohammed Rachedine
(74) *Attorney, Agent, or Firm* — Gable Gotwals

(57) ABSTRACT

A method and system of high speed radio frequency communication between an outside of a metallic pipeline or vessel and an interior volume contained by the metallic pipeline or vessel includes passing a high speed radio frequency signal through a communication portal having a high speed radio frequency permittive material exposed to the interior volume of the metallic pipeline and to the outside. The high speed radio frequency signal may be transmitted from the interior volume to the outside or from the outside to the interior volume. The communication portal may be a cylindrical- or planar-shaped body connected to the metallic pipeline. A tool located within the interior volume may transmit, receive, or transmit and receive the high speed radio frequency signal. The high speed radio frequency signal may be configured according to a 2.45 GHz standard protocol.

14 Claims, 4 Drawing Sheets

(51) Int. Cl.
*H04B 13/00* (2006.01)
*H04B 7/15* (2006.01)
*H04L 29/08* (2006.01)

(56) References Cited

U.S. PATENT DOCUMENTS

| | | |
|---|---|---|
| 2007/0063914 A1 | 3/2007 | Becker |
| 2009/0289808 A1* | 11/2009 | Prammer .............. E21B 17/003 340/853.7 |
| 2012/0312078 A1* | 12/2012 | Bakhtiar ................ G01N 29/14 73/40.5 A |
| 2014/0176344 A1* | 6/2014 | Littlestar ................ F16L 55/46 340/870.07 |
| 2016/0319980 A1* | 11/2016 | Hofer ...................... F16L 55/48 |

* cited by examiner

USE OF HIGH SPEED RADIO FREQUENCY PROTOCOLS FOR COMMUNICATION WITH PIPELINE PIGS AND INSPECTION TOOLS

CROSS-REFERENCE TO CO-PENDING APPLICATION

The present application claims priority to U.S. Provisional Application No. 62/575,999, filed Oct. 23, 2017, which is incorporated herein by reference.

BACKGROUND

This disclosure is in the field of signal communications to and from tools located within an oil or gas pipeline. More specifically, this disclosure relates to signal communications to and from these tools when in an interior space of a carbon steel or steel pipe or vessel using high speed radio frequency protocols.

High speed radio frequency communication—such as, but not limited to, Bluetooth, IEEE 802.15.4, WIFI, Xbee, Zigbee, Z-Wave, or their equivalents—are incapable of communicating across metallic boundaries such as a pipeline wall where the field is predominately electric and the Faraday Effect is significant. This inability creates significant issues which necessitate other more expensive technologies be employed when attempting a path of communication from the outside of the pipeline into the inner perimeter of the pipeline and, inversely, from the inside of the pipeline out to exterior receivers or repeaters.

Currently, low frequency communication is used. A low frequency approach requires a lot of power to drive the signal and make it through the wall of a carbon steel or steel pipeline. In many cases, the tool must be include a significant battery pack capability or a tethered power source, making the system relatively large and expensive. For example, signal frequencies may be about 20 Hz transmitting about 40 bits or so at a time. The low frequency approach is also fraught with issues relative to material cover of the pipeline that can and does limit the ability to transmit data. These transmission issues can worsen due to the amount of inherent moisture, groundwater and the soil depth, all of which can attenuate the signal. All of this creates significant hurdles when attempting to communicate with inline tools, tapping and plugging equipment, and pigging bodies.

SUMMARY

Embodiments of this disclosure include the use of high speed radio frequency protocols and media in connection with a communication portal arranged at pre-determined intervals or checkpoints located along a carbon steel or steel oil and gas pipeline, enclosure, or vessel. In embodiments, the communications portal is a radio frequency permissive body. A variety of high speed radio friendly materials may be utilized for this communication portal such as, but not limited to, polytetrafluoroethylene, polycarbonate, acrylic glass, polyvinylchloride, nylon, fiberglass, porcelain (ceramic), mica, glass, or graphite. In other embodiments, materials having a higher permittivity than those listed may be used provided the material does not degrade in the presence of the pipe or vessel wall and pipeline product (or vice versa). The radio friendly material may be a composite material.

In some embodiments, the portal may be in the form of a cylinder or the like, threaded into a wall of the pipe or vessel. In other embodiments, the portal may be in the form of a gasket located between, for example, bolted flange connections and exposed to an interior space of the pipe or vessel. In yet other embodiments, the portal may be a fitting of a kind known in the art—such as, but not limited to, a purge or equalization fitting—that is modified to provide the communications portal.

The use of the communication portal enables high speed radio frequency communication to and from a tool located within the pipeline. The radio frequency protocol may be a 2.45 GHz standard band protocol such as Bluetooth, IEEE 802.15.4, WIFI, Xbee, Zigbee, Z-Wave or their equivalents. The protocol may also be a 915 MHz band protocol. Or, the protocol may be a 5.8 GHz band protocol. For tools traversing the line, this communication can be accomplished without mechanical mechanisms such as triggers and magnets like those used in prior art pig signals. These mechanisms typically present failure points due to repeated strikes by a pig or because of oxidation and corrosion of the magnets. The portal may also be used in connection with hot tapping equipment or with plugging equipment The portal may provide a checkpoint for data download and upload. A repeater or amplifier, such as but not limited to, a pig signaling device may be magnetically mounted to the pipe above or next to the portal. Pockets of data from segments of a given pipeline may be uploaded—for example, data collected by the tool or relating to a status of the tool, and data may be dropped at these checkpoints along the way.

Data may be piggybacked to phone signals for transmission and sent to control rooms when a given pig or tool has either been launched or received. Triangulation based upon the signals may also be used to precisely locate equipment as well as locate any anomalies or defects found by the tool. The pig signaling device may be configured to support the serialized and geographical information being transmitted from each pig or tool as it passes known checkpoints.

Embodiments of a method of high speed radio frequency communication between an outside of a metallic pipeline and interior volume contained by the metallic pipeline may include passing a high speed radio frequency signal through a communication portal comprising a high speed radio frequency friendly material exposed to the interior volume of the metallic pipeline and to the outside. The high speed radio frequency signal may be a signal transmitted from the interior volume to the outside or transmitted from the outside to the interior volume. The signal may be transmitted to and from programmable control means such as one or more microprocessors with associated software or PLCs (or some combination thereof). The communication portal may comprise a cylindrical-shaped body connected to the metallic pipeline or a planar-shaped body connected to the metallic pipeline. The planar-shaped body may be configured as a gasket. The high speed radio frequency permittive material may include at least one material selected from the group consisting of polycarbonate, acrylic glass, polyvinylchloride, nylon, fiberglass, ceramic, mica, glass, and graphite. The method may include a tool configured to transmit, receive, or transmit and receive the high speed radio frequency signal. The tool may be selected from the group consisting of a tool configured to traverse at least a portion of the metallic pipeline, a tool configured to inspect at least a portion of the metallic pipeline, a tool configured to isolate at least a portion of the metallic pipeline, and a tool configured to tap into at least a portion of the metallic pipeline. The metallic pipeline may be a high pressure pipeline. The high speed radio frequency signal the high speed radio frequency signal may fall within an industrial, scientific and medical (ISM) radio band selected from the group consisting of a 915 MHz band, a 2.45 GHz band, and a 5.8 GHz band.

Embodiments of a system a system of high speed radio frequency communication between an outside of a metallic pipeline and an interior volume contained by the metallic pipeline may include one or more communication portals located along the metallic pipeline, said communication portals comprising a high speed radio frequency permittive material exposed to the interior volume of the metallic pipeline and to the outside. One or more repeaters may be located along the metallic pipeline, each repeater being within a signal reception distance of a respective communication portal. The communication portal may comprise a cylindrical-shaped body connected to the metallic pipeline or may comprise a planar-shaped body connected to the metallic pipeline. The planar-shaped body may be configured as a gasket. The high speed radio frequency permittive material may include at least one material selected from the group consisting of polycarbonate, acrylic glass, polyvinyl-chloride, nylon, fiberglass, ceramic, mica, glass, and graphite. The system may include a tool configured to transmit, receive, or transmit and receive the high speed radio frequency signal. The tool may be selected from the group consisting of a tool configured to traverse at least a portion of the metallic pipeline, a tool configured to inspect at least a portion of the metallic pipeline, a tool configured to isolate at least a portion of the metallic pipeline, and a tool configured to tap into at least a portion of the metallic pipeline. The system may further comprise programmable control means located outside of the metallic pipe, the control means configured to transmit, receive, or transmit and receive the high speed radio frequency signal. The programmable control means may be one or more microprocessors with associated software or PLCs (or some combination thereof). The high speed radio frequency signal the high speed radio frequency signal may fall within an industrial, scientific and medical (ISM) radio band selected from the group consisting of a 915 MHz band, a 2.45 GHz band, and a 5.8 GHz band.

NUMBERING AND ELEMENTS USED IN THE DRAWINGS AND DESCRIPTION

Figure 1:
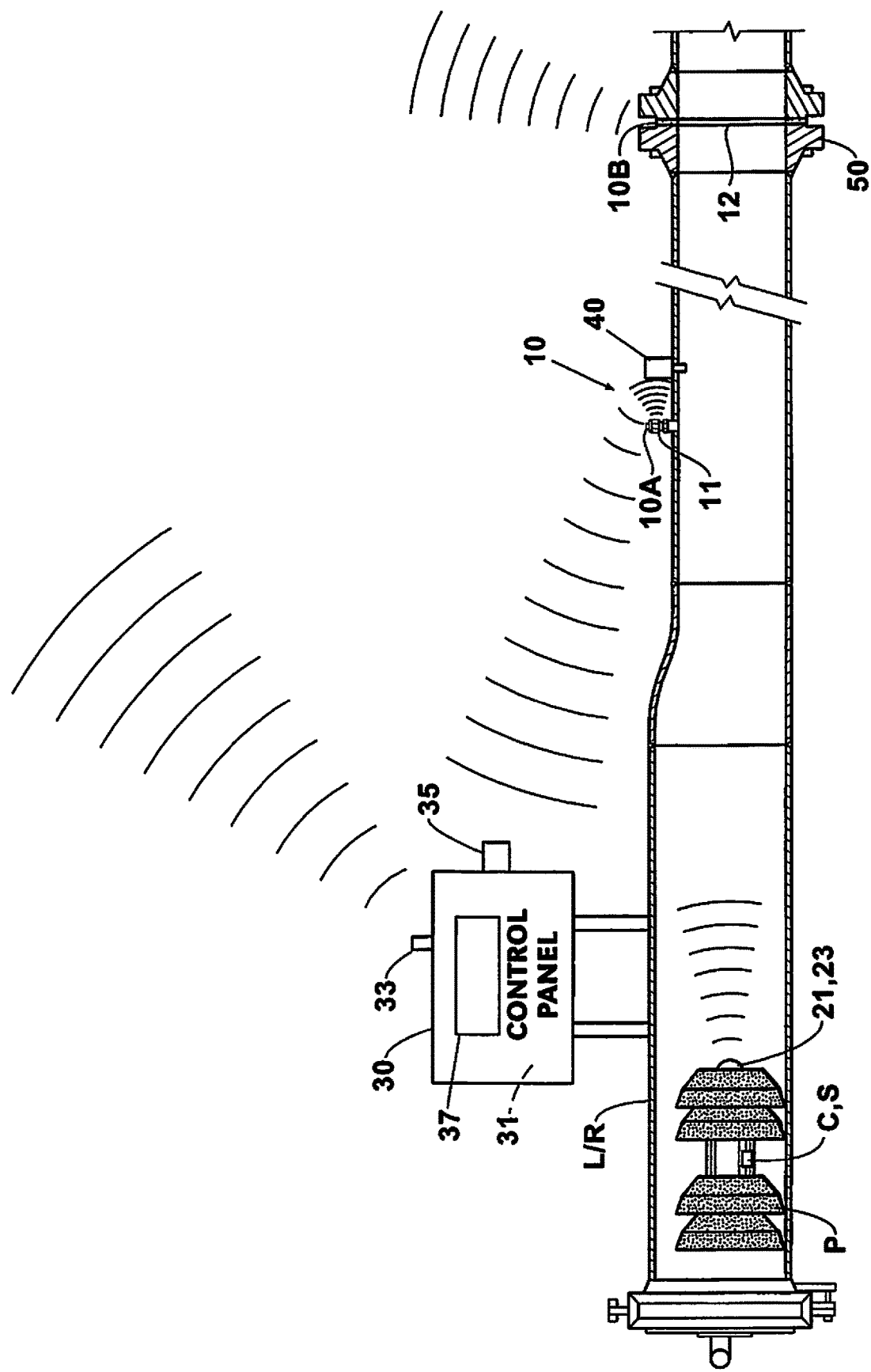
FIG. 1 is a schematic of an embodiment of the system and method of this disclosure. One or more communication portals comprised of a high speed radio frequency friendly material are located along a pipeline for providing high speed radio frequency communication into and from an interior of the steel pipeline. The portal may be a gasket located between bolted flanges and providing a pathway into and out of the pipeline.

10 Communication portal
10A Cylindrical-shaped portal
10B Planar-shaped portal
11 Cylindrical-shaped body or stent
12 Gasket
13 Fitting
15 Threaded portion
17 Wrapper
19 Ferrule connector
21 Transmitter or sending unit
23 Receiver or receiving unit
30 Control panel
31 Controller
33 Transmitter or sending unit
35 Receiver or receiving unit
37 Graphical user interface
40 Signal repeater or amplifier
50 Flanged connection Definitions High or high speed radio frequency means a frequency and wavelength corresponding to ITU band number 9, that is, 300 MHz to 3,000 MHz, 1 m to 0.1 m; or a lower end of ITU band number 10, 3 GHz to 30 GHz, 100 mm to 10 mm (below 6 GHz). In embodiments, the frequency lies within a frequency range designated as an industrial, scientific and medical (ISM) band. In some embodiments, the frequency range may be a 2.45 GHz band or standard protocol (in a range of 2.4 GHz to 2.5 GHz, there being subranges within this broader range). The protocol may also be a 915 MHz band protocol (in a range of 902 MHz to 928 MHz, there being subranges within this broader range). Or, the protocol may be a 5.8 GHz band protocol (in a range of 5.725 GHz to 5.875 GHz, there being subranges within this broader range).

A high speed radio frequency friendly or permittive material is a solid phase (as opposed to liquid or gas phase) material through which a high speed radio frequency wave can propagate, the relative permittivity or dielectric constant of the material being greater than or equal to 1. The material may be considered radio signal transparent as opposed to reflective or absorbent.

High pressure means a pressure in a range of 200 psig (13.8 bar) to 2,000 psig (138 bar), there being subranges within this broader range, requiring a carbon steel or steel pipe or vessel.

DETAILED DESCRIPTION

Embodiments of this disclosure allow high speed radio frequency communication methodologies to be applied to pipeline tools by creating a viable escape route or path for the radio signal through a steel pipe or metal enclosure or vessel while not creating a structural impact to the pipe, enclosure, or vessel. This escape path then becomes a communication portal by design, allowing a viable communication pathway to become a bridge to expand the methods available for communication. The escape path may be in the form of a cylinder or stent made of a radio frequency friendly material passing through a wall of the pipe or vessel, or it may be in the form of a gasket that is exposed to an interior space of the pipe or vessel. The radio frequency may be transmitted from inside the interior space of the pipeline or into the interior space of the pipeline depending on the specific need of communication and distance required.

In embodiments, a high speed radio frequency friendly material, capable of serving as an in-situ corridor or communication portal is placed within the pipeline or vessel wall, allowing the high frequency radio signals to be transmitted or leaked through the wall. Several high speed radio friendly materials may be utilized for this communication portal such as, but not limited to, polytetrafluoroethylene (dielectric constant k of about 2), polycarbonate (about 3), acrylic glass (about 3-4), polyvinylchloride (about 4), nylon (about 4-5), fiberglass (about 4-5), porcelain (ceramic) (about 4-7), mica (about 5-8), glass (about 5-10), and graphite (about 10-15). Materials having higher permittivity than those listed may also be used. By way of a non-limiting example, higher permittivity ceramics may be used. The material selected should not degrade when in contact with the pipe or vessel wall or when in contact with the pipeline product (and vice versa). For example, the pipeline product may include $H_2S$ or $NH_3$. The portal may be retained in the wall by means similar to those used for pipeline signaling devices, for example, or used for purge and equalization fittings. In some embodiments, the retaining means may include a nylon ferrule or its equivalent.

The material used for the portal may be a composite that includes one or more high speed radio frequency friendly materials. In other embodiments, one radio friendly material or composite may be partially encapsulated or wrapped by another radio friendly material or composite having the necessary compressive strength for securing the portal in the pipe or vessel wall. In other words, the materials may differ in their compressive strength, with the connecting material providing greater compressive strength than the primary signal transmitting material. By way of a non-limiting example, porcelain or glass may be wrapped in a polycarbonate or polyvinylchloride wrapper or fitting or fiberglass may be wrapped in a plastic wrapper or fitting. In some embodiments, the material may be partially encapsulated or wrapped by a non-radio friendly material such as, but not limited to, a metallic wrapper or fitting, that provides the necessary compressive strength to secure the radio friendly material to the pipe or vessel wall.

By way of a non-limiting example, the communication portal may include one or more cylindrical-shaped stents placed in the pipeline or vessel wall to provide a path for streaming of radio communication into and from an interior space of the pipeline. In some embodiments, the stent may have a height equal to the wall thickness. In other embodiments, the stent may have a height greater than that of the pipeline wall thickness, with minimal to no intrusiveness into the interior space of the pipeline. In yet other embodiments, the stent may have a height less than that of the wall thickness. In all cases, the stent must provide a pathway into and out of the interior space of the pipe or vessel.

The radio communication may be made by a standard or typical radio frequency module or protocol using, for example, a 2.45 GHz industrial, scientific and medical (ISM) band. The protocol may be Bluetooth, IEEE 802.15.4, WIFI, Xbee, Zigbee, Z-Wave or their equivalents. In some embodiments, the high speed radio communication may be a proprietary radio frequency protocol. The protocol may also be a 915 MHz band protocol. Or, the protocol may be a 5.8 GHz band protocol.

The communication portal may be any number of natural or manmade dielectric materials having sufficient permittivity, allowing a high speed radio signal to transmit across the body. The material used for the portal is a different material than that of the pipe or vessel, even in cases in which the pipe or vessel may be a radio friendly material (such as may be the case in lower pressure oil and gas applications below 200 psig (13.8 bar). This permits differences in signals to be detected between the portal and the pipe or vessel material.

In some embodiments, the material is a moldable material. In other embodiments, the material is a machinable material. Graphite and polycarbonate materials are examples of materials that can be machined into geometries capable of being utilized as a cylindrical-shaped portal or stent. A portion of the material may be configured for connection to the wall without blocking the communication pathway into and out of the stent. For example, the stent may include threads for easy integration into the wall of the pipeline or vessel. In some embodiments, a metallic or plastic wrapper including threads may be used. A SWAGELOCK® ferrule approach may be used to hold the communication stent in place with little or no problem in pressures approaching 2,000 psig (138 bar). The stent should be configured to resist pressures in a range of 200 psig (13.8 bar) to 1,500 psig (103.4 bar) up to 2,000 psig (138 bar), there being discrete pressures and subranges within this broader range.

A sending unit may be added to the tool inside the pipeline or vessel. The tool may be a pipeline pig, a plug, or an inspection tool. The tool may also include a camera or other imaging sensors. In embodiments, the sending unit has sufficient memory and programming to be able to transmit serialized data as well as measured data to a receiving unit placed close to or near the communication stent on the outside of the pipe. The receiving unit can be located within 300 ft to 500 ft (91 m to 152 m) of the stent and a robust signal be received. In other embodiments, the receiving unit is located within this 300 ft (91 m) radius. The received signal can then be processed using engineering or signal processing algorithms of a kind known in the art. Where explosion proofing is required, the sending unit may be placed in a liquid- or gas-friendly vessel such that the signal is captured and transmitted on the outside of the wall. The receiving unit may accept the signal, configure the data into a useful compiled engineering format for processing, and allow the compiled data to be processed by a microprocessor or computer, depending on the complexity of the tool and the amount of data input/output being processed.

By way of a non-limiting example, testing has shown the capacity to receive a WIFI signal that was transmitted through a stent passing through a pipe having a wall thickness of more than ⅜ inch (9.5 mm). Signal reception was proven at distances of up to 500 ft (152 m), which may be amplified. A receiving unit positioned within this range can be used to receive data from inside the pipeline, leading to the processing of the same data in short order by a microprocessor or a computer including one or more microprocessors with associated software. Whether a micro-processor or a computer is used depends, in part, on the amount of data input/output and speed needed for processing. Repeaters or amplifiers may be provided boost the signal and the distance it may be carried from the source.

Referring FIG. 1, in embodiments of a system and method of this disclosure, one or more communication portals 10A, 10B, made of a high speed radio frequency friendly material, are placed at predetermined locations along a pipeline or vessel. For example, a portal 10 may be placed in a launcher or a receiver L/R with one or more spaced-apart portals 10 located between the launcher and receiver. In some embodiments, the portals 10 are located where prior art pig signaling devices are or would be located. Radio frequency signals sent to and from an interior space of the pipeline pass through the portal 10. The portal 10A may be in the form of a stent or cylindrical-shaped body 11 (see FIGS. 2 and 3). In other embodiments, the portal 10A includes a fitting of a kind known in the art but modified to provide the portal, which essentially functions as an antenna. In other embodiments, the portal 10B may include a planar-shaped body or gasket 12 having exposure to an interior of the pipeline or vessel. For example, the gasket 12 may be located between a bolted flange connection 50 like that connecting two sections of pipeline. The sections may be a tee or a branch connection or may be a valve.

In embodiments, a radio frequency transmitter or sending unit 21 may be fitted into or on a typical pipeline pig P. For purposes of this disclosure, the pig may be configured as a separation pig, a maintenance or cleaning pig, or as an inspection tool. The pig may be a module of a larger pig train. The pig may also include a one or more controllers C with associated hardware and software and one or more sensors S in communication with sending unit 21. The controller C may be contained or nested within, or located on, the pig or tool. The controller C may be in communication with one or more sensors S and may control one or more functions of the pig. The sensor S may collect data on one or more pipeline characteristics or the pig. The sending unit 21 transmits at a radio frequency signal. The pig may also include a radio frequency receiver or receiving unit 23 in communication with the controller C. Units 21, 23 may be combined.

In some embodiments, a control panel 30 houses an controller 31 including a configuration processor and associated software. The control panel 30 may also include a radio frequency sending unit 33 and a radio frequency receiving unit 35. Units 33, 35 may be combined. The panel 30 may also include a graphical user interface 37 with appropriate input controls. In some embodiments, the controller may be a PLC.

The controller 31 may configure the information the sending unit 20 transmits to the tool. In some embodiments, the tool is a pipeline pig. The configured information could maintain the serialized name of the pig, the time it is to be launched, the date it is to be launched, where it will be in transit to, the type of pig that it is (e.g., cleaning, batching, swabbing, inspection), and its power level. The electronic unit 31 may allow the information to be scripted, bundled, and sent to the pig sending unit 20 such that, once the pig is turned on, the pig may continue to transmit this information repeatedly as long as the pig remains in the pipeline, or as it moves its way through the pipeline, or until it runs low on power. As this signal is transmitted inside the pipeline, a series of communication portals 10 located at predetermined locations along the length of the pipeline provide a communication corridor between the inside and outside of the pipeline. The portal 10 may be located at or near a repeater or amplifier 40 configured to transmit the received data. In some embodiments, the repeater 40 is a pig signaling device.

Figure 2A:
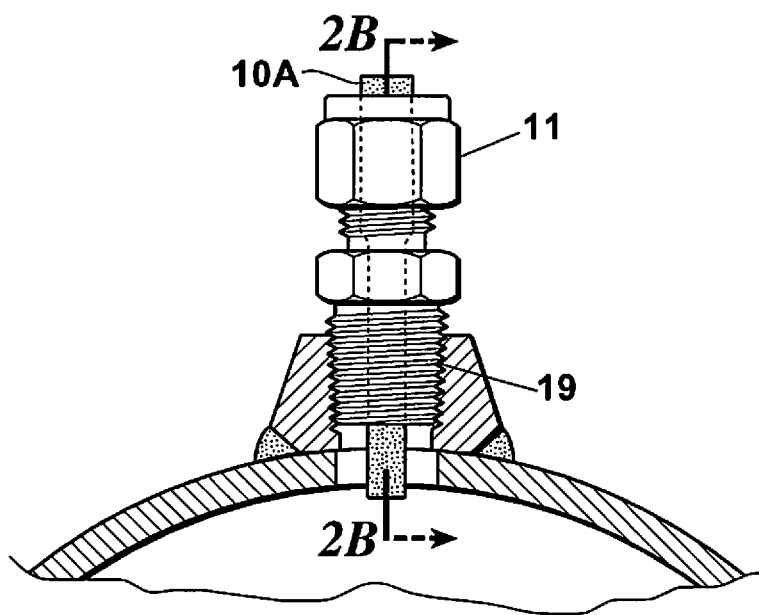
FIG. 2A is a front elevation view of an embodiment of a cylindrical-shaped communication portal that may be threaded into the wall of the pipeline using a SWAGE-LOCK® type fitting or its equivalent.
Figure 2B:
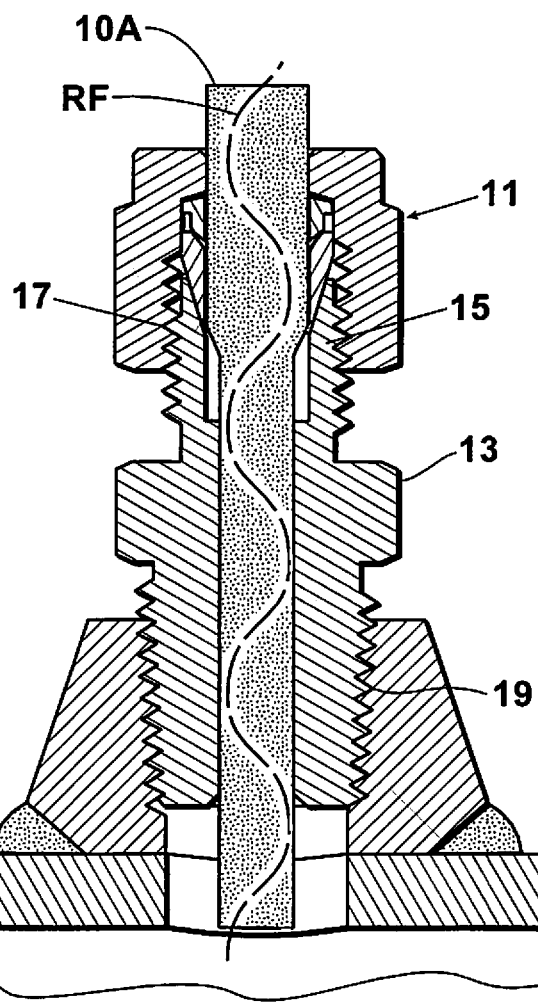
FIG. 2B is a cross-section view taken along section line 2B-2B of FIG. 2A.
Figure 3A:
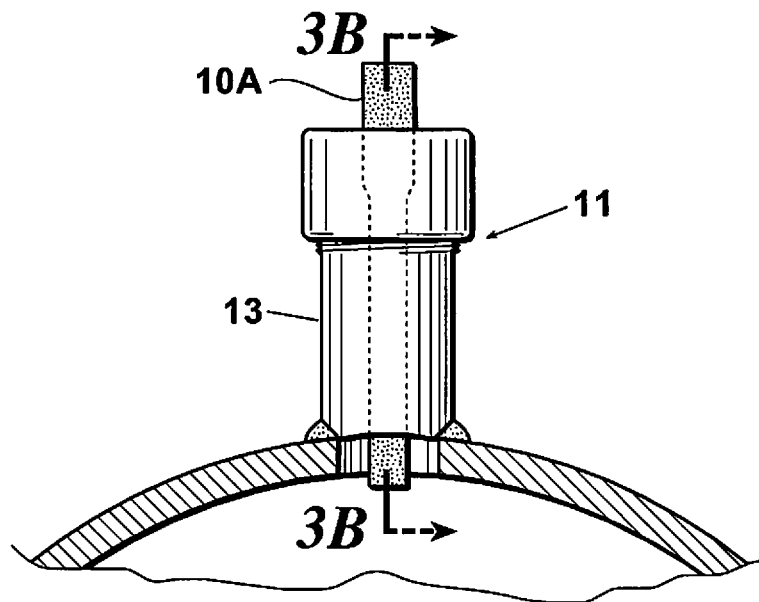
FIG. 3A is a front elevation view of another embodiment of a cylindrical-shaped communication portal that makes use of a modified purge or equalization fitting.
Figure 3B:
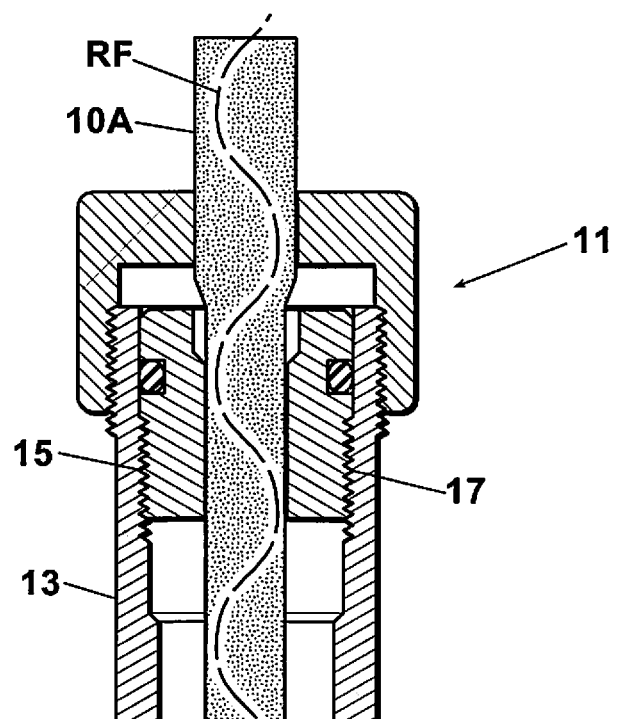
FIG. 3B is a cross-section view taken along section line 3B-3B of FIG. 3A.
Figure 4:
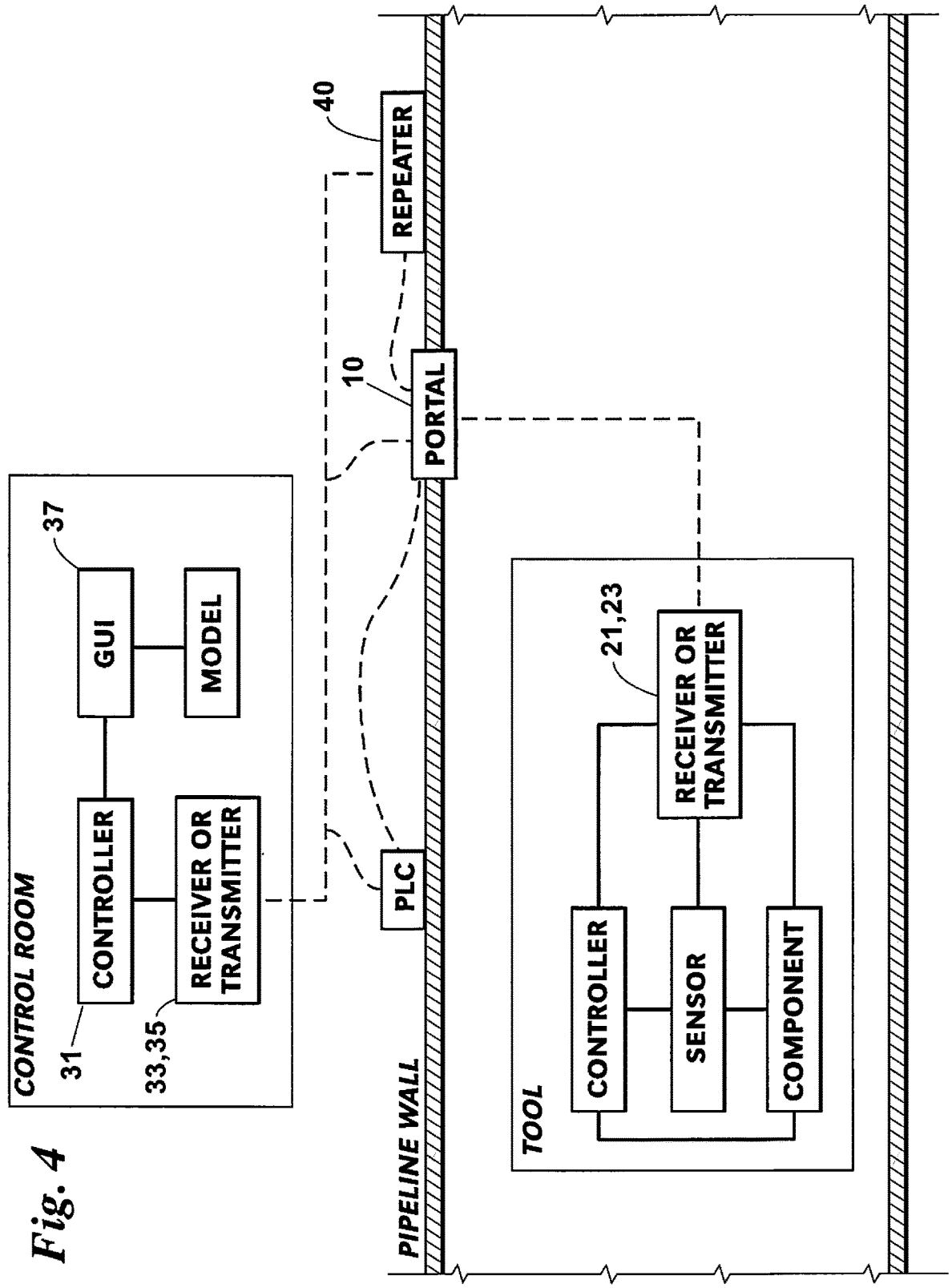
FIG. 4 is a schematic of an embodiment of a system and method of this disclosure. A remote control room or local programmable logic controller may send and receive high speed radio frequency signals to and from a tool located within an interior space of the pipeline as the tool approaches or passes by a portal.

Referring to FIGS. 2 and 3, in embodiments the portal 10A may be configured as a stent 11 having a radio frequency friendly cylindrical-shaped fitting 13 placed in the wall W of the pipeline to allow a radio frequency RF signal to either enter or exit the confines of the pipeline. The fitting 13 may include a threaded portion 15 for connection to the pipeline wall. The threaded portion may include a wrapper 17. Wrapper 17 may be metallic wrapper, a nylon wrapper, or a plastic wrapper. A ferrule connector 19 may be used.

In other embodiments, communication portal 10B may be a slot antenna made up of gasket material, placed within the pipeline and making use of the frequencies of interest. By way of a non-limiting example, a graphite-packed or graphite-impregnated gasket 12 may be used. See FIG. 1. The gasket 12 is exposed to the interior space of the pipe or vessel to function as an antenna to the outside of the pipe or vessel. A repeater 40 may be placed in close proximity to the gasket 12 on the outside of the pipe or vessel. The fitting may be a flanged connection 50 having the gasket 12 located between the flanges.

Repetitive testing using a signal generator of a predetermined strength and frequency showed that a graphite-impregnated gasket proved to be an effective signal leak path. Close proximity receiving units may be employed such that long range antennae are not necessarily required for pig sensing or small bundle data dumping as the pig passes in the pipeline. The signal that is being processed is, by design, a radio frequency leakage from the pipeline, allowing significant close proximity data to be realized. The data may be anything measured or serialized into the sending unit as needed to add value to the system and method.

In some embodiments, the fitting used for portal 10 may be of a kind used to mount pig signaling devices to a pipe wall and modified to include the portal 10. In other embodiments the fitting may be of kind used as a purge or equalization fitting and modified to include the portal 10. A non-limiting example of these kinds of fittings is a THREAD-O-RING™ fitting (TDW Delaware, Inc.) comprising a cap, plug, O-ring, and nipple, the portal coaxially aligned with and passing through the fitting components. The portal 10 may include a pickup for any type of physical transmission medium inclusive of radio frequency, acoustic (ultrasonic), or light such as a directed laser, for instance. The transmitting end may be wired or wireless: cell modem, sat modem, WIFI, or their equivalents. The fitting may make use of a gasket 12, provided there is a path By using the communication portal 10, the communication can be between the control panel 30 and sending unit 20 or between the sending unit 20 and a repeater or transmitter 40.In any method of communication, the communication portal 10 allows for two way communication with whatever is placed inside the pipeline. It also allows either of the two receiving units 35, 40 located outside the pipeline to then send a signal to the main control room of the end user to indicate that the pig was launched successfully and everything is operational as it should be. The control room may be a mobile control room, for example, located within a motorized vehicle. In some embodiments, the receiving unit is a drone-based receiving unit. In yet another mode the portal 10 allows the tool to transmit along the length of the pipeline, keeping in constant communication with each repeater 40 as it passes along the length of the pipeline. The repeaters may be pig signaling devices mounted along the pipeline. This allows the tool to remain in constant communication with the main control room of the end user to ensure the location and status of each tool it might have in the line. Used in conjunction with an automatic launcher a pipeline operator may have two or more tools in the line at all times and be able to stay in constant communication with them at all times to ensure their proximate location is known at all times.

This mode of communication is of significant importance when diagnostic tools are in use within the pipeline. When using an appreciable number of pig signaling devices the diagnostic tools can download proximate data along the length of the pipeline to better indicate the location of the equipment to analysis to more aggressively note the location of the diagnostic equipment at all times. It also allows small pockets of important data to be transmitted from within the pipeline at points along the way to ensure the tool is being used to the best of its capability.

In embodiments, a high speed radio frequency sending unit may be placed or nested inside or onto a pig (or other inline piece of equipment) prior to being inserted into the pipeline. When the launching of the pig is imminent, a controller on the control panel or contained within a pig signaling device may tell the pig-nested sending unit to turn on, or may turn on a nested timing sequence within the sending unit inside or on the pig. This approach allows the system to be sufficiently smart to save power when not needed. It also allows a pig to be serialized before each launch, giving it a name, a launch time, a destination and even an estimated time of arrival if appropriate; many added identifiers could be added to this serialization process to make the pig much more identifiable once armed. This data can then be transmitted back from the pipeline at check-in points along the pipeline, allowing intrinsic tracking of a given pigging device. To help with power, a passive energy harvesting device could also be utilized in conjunction with the fluid flow to maintain a completely charged transmitter when sitting in the pipeline awaiting its launch.

As the pig leaves the launcher it would then continually transmit the serialized information back from the pipeline through strategically spaced repeaters, allowing tracking as well as derived data obtained from inside the pipeline when relevant. This would be capable by using smart pig signaling devices located downstream of the launcher which could then verify that a pig did pass the signaling device, and log its logistical or serialized information (or both). This information would then be sent to the control panel monitoring the launch system and or the control room where the overall launch scenarios are monitored by means of the same RF Signal approach. This could also then be utilized to download small groups of partitioned data relative to measurements taken from inside the pipeline gained from the running of diagnostic tools. This can then be transmitted to a phone or control rooms located in some cases hundreds of miles away, allowing control room personnel to know that a given pig was successfully launched, and or specific data was collected.

In most cases several repeaters or pig signaling devices could then be placed at predetermined locations along the length of the pipeline to ensure the signal strength is sufficient to collect the data. The pig would continue to transmit specific logistical information to each and every signal as it passes the communication points to allow positive identification. Not only will it download this specific information but it can also check-in at each checkpoint, allowing the main control room to know its specific location by means of communication until it actually enters the receiver at its final destination. Upon entering the receiver point the pig will then notify the control room that it has finished its trek and is awaiting removal. Should the pig become stuck or hung up somewhere along the line; it will be easy to find since this constant communication will define where it placed the last communication. This approach allows the field crew to know the last signaling device it passed, and the next one that it did not pass; greatly reducing the linear range of pipeline where the field crew will need to look to find the unit.

In other embodiments, two receivers may be utilized and a GPS calculation done as part of the routine to allow the exact location of the pig to be found at any given time to greatly eliminate the time spent in looking for non-received pigs. This system may also be utilized to add additional intelligence to a pig or any pipeline device. In addition the system could also transmit information such as but not limited to GPS positioning, temperature of the fluid, and pressure of the fluid.

Due to the pipeline there could be induced errors due to many different effects, but would still be significantly better than today's current low radio frequency methodology. If the pig signaling or check-in devices are of known location and distance, it could also then be utilized to calculate and transmit velocity, acceleration, and distances between transmissions. Limitations as to what can be transmitted to receivers located on the outside of the pipeline can be controlled or bounded by the bandwidth and the power of the system.

Using embodiments of the system and method, devices such as the inline inspection equipment can become much easier to utilize while also making the isolation points much easier to find for the analysts attempting to isolate the defect. By way of a non-limiting example, using this system in conjunction with video or infrared camera capabilities the system could be utilized to inspect the inside of the pipeline when used in gaseous lines, assuming the pig has sufficient storage and battery power to be able to do so. The unit could then download upload isolated video of importance at each checkpoint to ensure it isolates the video to specific geographic or mechanical check points. This makes it much easier to isolate located defects relative to known dimensional intervals. Since the communication port is only minimally invasive, the body of the pig signaling devices can be magnetically mounted to the pipe, making it easy to move signaling devices and or add signaling devices to the pipeline.

The system and method may also add value to hot tapping and plugging equipment because it allows engineers to add sensors to a tapping or plugging system to allow the operators to physically watch the unit operate as the shafts turn and pressures build during operation. In some embodiments, this information may be translated into an animated model. The animation of the model could then be observed on a computer or controller screen to visibly see the location and operation of the tool, making the penetration of a live line much safer. For example, the indexing of the tool as it inserts could be noted as well as the axial extension of the tool. As the pivot shafts of the tool begin to turn a series of potentiometers showing rotational positioning would show the angle of the moving components integral to the tool. Pressure transmitters could be applied to the upstream and downstream surfaces of the tool to show leakage as the tool is blown down and as it is holding pressure. An increase in the downstream side of the tool would indicate a subtle leakage across the tool to keep operators safe and informed.

The application of a communication portal allows a radio frequency communication between any tools inside the pipeline and allows operators or engineers outside the pipeline to be more informed during real time operation. In many cases the operator would be able to tell a tool when to inflate a sealing element, monitor differential pressures as the unit is blown down, tell a tool when to retract and how quickly, and even monitor a tool that is planned to be in the line for several weeks while work is ongoing relative to the pipeline. The application of this system and method may allow visual inspection tools to inspect valves and make real time measurements of points as the point is being inspected by video during operation. This would allow analysis to be done while the tool is still in the pipeline, and not have to be formalized after the tool is removed, leaving questions or indecisiveness.

The use of a radio frequency signal offers significant capabilities to be expanded relative to in-situ equipment. The system and method allows operators and engineers to operate the equipment in a safer and more expedient manner while also allowing them to process the data more quickly, and with better resolution regarding accuracy. The system and method allows the data to be received and processed without the removal and reinsertion of the equipment and check points to be used along the length of a pipeline. An easier analysis platform is realized and with fewer unknowns. Analysts can also use road marks employed along the pipeline to allow electronic checks. Or, the road marks may be applied to aid in accurate location of found defects. The defects can be isolated to a one or two mile section as opposed to, for example, a thirty mile section. This kind of isolation will greatly reduce the work and potential error of analysts in their ability to identify the location of a pipeline defect.

Cameras may also be triggered when a supposed defect point is noted inside a given pipeline. This provides an ability to document small caches of visual or geometrical data that can be quickly and easily transmitted for documentation. This data can then be bundled in a small film clip and transmitted from the pipeline at the next available receiver along with coordinates to help locate the point after the fact if necessary. Instead of working, for example, on a 20- or 50-mile (32- or 80-km) length of pipe, an operator or analyst would be able to review the check points to isolate the defect immediately to more manageable area, for example, demarcation points of one mile intervals or less This allows the accuracy to be greatly increased and also reduces the analytical time to find the defect. This reduces the time to find the defect and also reduces the cost to the customer for whom the work is being performed.

While embodiments of the use of high speed radio frequency protocols for communication with pipeline pigs and inspection tools have been described, systems and methods of this disclosure may be designed without departing from the scope of the following claims, the recited claim elements being entitled to their full range of equivalents.

The invention claimed is:

1. A method of high speed radio frequency communication between an outside of a metallic pipeline and an interior volume contained by the metallic pipeline, the method comprising:
passing a high speed radio frequency signal through one or more communication stents located along, and contained by, a wall of the metallic pipeline, said communication stents each being a cylindrical-shaped communication stent arranged perpendicular to a longitudinal axis of the metallic pipeline;
each said communication stent further comprising a high speed radio frequency permittive material and a wrapper located about the permittive material;
the permittive material and the wrapper differing from one another in compressive strength, the wrapper spanning at least an entire thickness of the wall, the permittive material having one end extending past an inner diameter of the wall into the interior volume of the metallic pipeline and another end extending past an outer diameter of the wall to the outside of the metallic pipeline.

2. The method of claim 1, further comprising the high speed radio frequency signal being a signal transmitted from the interior volume to the outside.

3. The method of claim 1, further comprising the high speed radio frequency signal being a signal transmitted from the outside to the interior volume.

4. The method of claim 1, wherein the high speed radio frequency permittive material includes at least one material selected from the group consisting of polycarbonate, acrylic glass, polyvinylchloride, nylon, fiberglass, ceramic, mica, glass, and graphite.

5. The method of claim 1, further comprising a tool configured to transmit, receive, or transmit and receive the high speed radio frequency signal.

6. The method of claim 5, wherein the tool is selected from the group consisting of a tool configured to traverse at least a portion of the metallic pipeline, a tool configured to inspect at least a portion of the metallic pipeline, a tool configured to isolate at least a portion of the metallic pipeline, and a tool configured to tap into at least a portion of the metallic pipeline.

7. The method of claim 1, wherein the high speed radio frequency signal falls within an industrial, scientific and medical (ISM) radio band selected from the group consisting of a 915 MHz band, a 2.45 GHz band, and a 5.8 GHz band.

8. A system of high speed radio frequency communication between an outside of a metallic pipeline and an interior volume contained by the metallic pipeline, the system comprising:
one or more communication stents located along, and contained by, a wall of the metallic pipeline, said communication stents each being cylindrical-shaped and arranged perpendicular to a longitudinal axis of the metallic pipeline;
each said communication stent further comprising a high speed radio frequency permittive material and a wrapper located about the permittive material;
the permittive material and the wrapper differing from one another in compressive strength, the wrapper spanning at least an entire thickness of the wall, the permittive material having one end extending past an inner diameter of the wall into the interior volume of the metallic pipeline and another end extending past an outer diameter of the wall to the outside of the metallic pipeline.

9. The system of claim 8, further comprising one or more repeaters located along the metallic pipeline, each repeater being within a signal reception distance of a respective communication portal.

10. The system of claim 8, wherein the high speed radio frequency permittive material includes at least one material selected from the group consisting of polycarbonate, acrylic glass, polyvinylchloride, nylon, fiberglass, ceramic, mica, glass, and graphite.

11. The system of claim 8, further comprising a tool configured to transmit, receive, or transmit and receive the high speed radio frequency signal.

12. The system of claim 11, wherein the tool is selected from the group consisting of a tool configured to traverse at least a portion of the metallic pipeline, a tool configured to inspect at least a portion of the metallic pipeline, a tool configured to isolate at least a portion of the metallic pipeline, and a tool configured to tap into at least a portion of the metallic pipeline.

13. The system of claim 8, further comprising programmable control means located outside of the metallic pipe, the control means configured to transmit, receive, or transmit and receive the high speed radio frequency signal.

14. The system of claim 8, wherein the high speed radio frequency signal falls within an industrial, scientific and medical (ISM) radio band selected from the group consisting of a 915 MHz band, a 2.45 GHz band, and a 5.8 GHz band.

* * * * *